(12) United States Patent
Chen et al.

(10) Patent No.: US 7,418,625 B2
(45) Date of Patent: Aug. 26, 2008

(54) DEADLOCK DETECTION AND RECOVERY LOGIC FOR FLOW CONTROL BASED DATA PATH DESIGN

(75) Inventors: Jiann-Tsuen Chen, Saratoga, CA (US); Guang-Ting Shih, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 569 days.

(21) Appl. No.: 10/953,463

(22) Filed: Sep. 29, 2004

(65) Prior Publication Data
US 2006/0061689 A1 Mar. 23, 2006

Related U.S. Application Data

(60) Provisional application No. 60/608,303, filed on Sep. 9, 2004.

(51) Int. Cl.
*G06F 11/00* (2006.01)
(52) U.S. Cl. .................. 714/10; 712/216; 712/219; 348/663
(58) Field of Classification Search ........... 714/51; 712/219
See application file for complete search history.

(56) References Cited

U.S. PATENT DOCUMENTS

| | | | | |
|---|---|---|---|---|
| 5,006,980 A | * | 4/1991 | Sanders et al. ........... | 712/219 |
| 5,706,443 A | * | 1/1998 | Brady et al. ............... | 710/52 |
| 5,732,206 A | * | 3/1998 | Mendel ..................... | 714/4 |
| 5,761,454 A | * | 6/1998 | Adusumilli et al. ...... | 710/311 |
| 5,884,101 A | * | 3/1999 | Wu ........................... | 710/57 |
| 6,035,389 A | * | 3/2000 | Grochowski et al. .... | 712/216 |
| 6,073,182 A | * | 6/2000 | Jones et al. ................ | 709/253 |
| 6,292,488 B1 | * | 9/2001 | Filgate ...................... | 370/401 |
| 6,553,512 B1 | * | 4/2003 | Gibson ...................... | 714/17 |
| 6,629,167 B1 | * | 9/2003 | Undy et al. ................ | 710/52 |
| 6,993,641 B2 | * | 1/2006 | Wong et al. ............... | 712/219 |
| 7,152,152 B2 | * | 12/2006 | Barrick ..................... | 712/220 |
| 7,219,268 B2 | * | 5/2007 | Adkisson et al. ......... | 714/55 |

OTHER PUBLICATIONS

Microsoft Press Computer Dictionary Third Edition, "time out", Microsoft Press, 1997, p. 469.*

* cited by examiner

*Primary Examiner*—Gabriel L Chu
(74) *Attorney, Agent, or Firm*—McAndrews, Held & Malloy, Ltd.

(57) ABSTRACT

Certain embodiments of the invention may be found in a method and system for handling deadlock conditions in a data processing system. Aspects of the method may comprise identifying a potential deadlock state in a distribute and merge data processing system. An actual deadlock state may be detected once the potential deadlock state is identified. The detected actual deadlock state may be indicated by generating a signal. The method may comprise initiating recovery from deadlock conditions by generating at least one signal that indicates when data is accepted in response to the indication of the actual deadlock state.

45 Claims, 7 Drawing Sheets

US 7,418,625 B2

DEADLOCK DETECTION AND RECOVERY LOGIC FOR FLOW CONTROL BASED DATA PATH DESIGN

CROSS-REFERENCE TO RELATED APPLICATIONS/INCORPORATION BY REFERENCE

This application makes reference to, claims priority to, and claims the benefit of U.S. Provisional Patent Application Ser. No. 60/608,303, filed on Sep. 9, 2004.

The above stated application is incorporated herein by reference in its entirety.

FIELD OF THE INVENTION

Certain embodiments of the invention relate to deadlock detection. More specifically, certain embodiments of the invention relate to a method and system for deadlock detection and recovery logic for flow control based data path design.

BACKGROUND OF THE INVENTION

A composite video signal is the sum of a luminance (brightness) signal and a chrominance (color) signal. These signals may be referred to as luma and chroma signals, respectively. The frequency ranges of the luma and chroma signals are designed to overlap. In video processing, the luma and chroma signal components are added together in order to generate a composite video signal. The luma and chroma video elements are integrated and broadcasted as a single composite video stream. Once the broadcasted composite signal is received, the luma and chroma signal components may be separated in order for the video signal to be processed and displayed. A comb filter may be utilized for separating the chroma and luma video signal components. For example, a television may be adapted to receive a composite video input and utilize an integrated comb filter to separate the chroma and luma video signal components. However, before the television can display the received video signal, the chroma and luma video components have to be separated.

In a flow control based system, for example, a video processing system, a set of processes may be deadlocked if each process in a set is waiting for an event that only another process in the set may cause. As all the processes are waiting, none of them may ever cause any of the events that may wake up any of the other members of the set, and all the processes may continue to wait forever. Each member of the set of deadlocked processes may be waiting for a resource that is owned by a deadlocked process. As a result, none of the processes may be able to run or release any resources, and none of them may be awakened.

In the flow control based data path design, each block may receive and process data asynchronously. When a programming error occurs, it may cause a pipeline to stall, for example, a deadlock situation for a distributed and merge design. The system may not be able to self-recover from a deadlock situation, even when the programming error has been rectified and may be resolved only by a manual reset.

FIG. 1 is a block diagram of a conventional system that utilizes a distribute and merge data processing system. Referring to FIG. 1, the system 100 comprises a distribute control block 102, luma filter 104, chroma filter 106 and merge control block 108. The distribute control block 102 may receive data from similar distribute and merge data processing systems and distribute data between two or more data paths, for example, path 1 and path 2. The luma filter 104 may be a notch and bandpass filter, for example, and may be adapted to allow luma data through and block chroma data. The chroma filter 106 may be a comb filter, for example, and may be adapted to separate chroma data from luma data in the frequency domain. The merge control block 108 may be adapted to receive data from path 1 and path 2, and merge this data from two or more data paths, for example, path 1 and path 2.

In operation, when another similar system intends to transmit data to distribute control block 102, it may send a i_ready signal to distribute control block 102. When distribute control block 102 is ready to accept data it may send an acknowledge signal o_accept and may begin to accept data. When distribute control block 102 has data ready to be transmitted to the luma filter 104, it may send a ready1.p1 signal to the luma filter 104 and when the luma filter 104 is ready to accept data it may respond by sending an accept1.p1 signal back to distribute control block 102 and data may begin to flow from distribute control block 102 to the luma filter 104. The luma filter 104 may continue to receive and process data until it reaches its capacity. When the luma filter 104 intends to transmit data downstream to the merge control block 108, it may send a ready2.p1 signal to the merge control block 108. When the merge control block 108 is ready to accept data it may send an acknowledge accept2.p1 signal back to the luma filter 104 and data may begin to flow from the luma filter 104 to the merge control block 108. When the merge control block 108 intends to transmit data to another similar system it may send an o_ready signal and begin transmitting data when it receives an i_accept signal from the other system.

When the distribute control block 102 has data ready to be transmitted to the chroma filter 106, it may send a ready1.p2 signal to the chroma filter 106 and when the chroma filter 106 is ready to accept data it may respond by sending an accept1.p2 signal back to distribute control block 102 and data may begin to flow from distribute control block 102 to chroma filter 106. The chroma filter 106 may continue to receive and process data until it reaches its capacity. When the chroma filter 106 intends to transmit data downstream to the merge control block 108, it may send a ready2.p2 signal to the merge control block 108. When the merge control block 108 is ready to accept data it may send an acknowledge signal accept2.p2 back to the chroma filter 106 and data may begin to flow from the chroma filter 106 to the merge control block 108.

A programming error may cause a deadlock situation to arise in a distribute and merge data processing system, wherein one of the data paths may be full of data, while the other data path may be empty. The deadlock situation may not be resolved by correcting the programming error, and the only way the distribute and merge data processing system may recover from the deadlock situation is by a manual reset of hardware, which may cause a loss of valuable information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for handling deadlock conditions in a data processing system. Aspects of the method may comprise identifying a potential deadlock state. An actual deadlock state may be detected once the potential deadlock state is identified. The detected actual deadlock state may be indicated by generating a signal. The method may comprise initiating recovery from deadlock conditions by generating at least one signal that indicates when data is accepted in response to the indication of the actual deadlock state.

At least a first input signal and a first output signal may be received, which are associated with at least a first data path, and which may be utilized to detect the potential deadlock state. The received first input signal and the first output signal associated with the first data path may be processed to detect the potential deadlock state. When the potential deadlock state is detected, at least a second signal may be generated. At least a second input signal and a second output signal may be received, which are associated with at least a second data path, and which may be utilized to detect the potential deadlock state. The received second input signal and the second output signal associated with the second data path may be processed to detect the potential deadlock state. When the potential deadlock state is detected, at least a third signal may be generated.

At least a fourth signal may be generated that initializes a counter in response to receiving the second signal and the third signal that detects the potential deadlock state. The output of the counter may be compared with a particular value to detect the actual deadlock state. At least a first signal may be generated if the output of the counter is greater than the particular value. The first signal indicating actual deadlock state may be received for initiating recovery. At least a fifth signal may be generated, which is associated with at least the first data path and may be utilized for initiating recovery in response to receiving the generated first signal. At least a sixth signal may be generated which is associated with at least the second data path, and may be utilized for initiating recovery in response to receiving the generated first signal.

Another embodiment of the invention may provide a machine-readable storage, having stored thereon, a computer program having at least one code section executable by a machine, thereby causing the machine to perform the steps as described above for deadlock detection and recovery logic for flow control based data path design.

In accordance with another embodiment of the invention, a system for handling deadlock conditions in a data processing system may be provided. In this regard, the system may comprise circuitry that may identify a potential deadlock state. Circuitry may be adapted to detect an actual deadlock state once the potential deadlock state is identified. Circuitry may be adapted to indicate the detected actual deadlock state by generating a signal.

The system may comprise circuitry for initiating recovery from deadlock conditions, by generating at least one signal that indicates when data is accepted in response to the indication of the actual deadlock state. The circuitry may be adapted to receive at least a first input signal and a first output signal, which are associated with at least a first data path, and may be utilized to detect the potential deadlock state. The system may further comprise circuitry that may be adapted to receive and process the first input signal and the first output signal associated with the first data path to detect the potential deadlock state. The circuitry may be adapted to generate at least a second signal when the potential deadlock state is detected. The system may comprise circuitry that receives and processes at least a second input signal and a second output signal associated with at least a second data path to detect the potential deadlock state. The circuitry may be adapted to generate at least a third signal when the potential deadlock state is detected. The system may further comprise circuitry that generates at least a fourth signal that initializes a counter in response to receiving the second signal and the third signal, which detects the potential deadlock state.

A comparator may be adapted to compare the output of the counter with a particular value so as to detect the actual deadlock state. The comparator may be further adapted to generate at least a first signal if the output of the counter is greater than the particular value. The system may comprise circuitry that generates at least a fifth signal associated with at least the first data path, which may be utilized for initiating recovery in response to receiving the generated first signal. Circuitry may also be provided which may be adapted to generate at least a sixth signal associated with at least the second data path, which may be utilized for initiating recovery in response to receiving the generated first signal.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for handling deadlock conditions in a data processing system. Aspects of the method may comprise identifying a potential deadlock state in a distribute and merge data processing system. An actual deadlock state may be detected once the potential deadlock state is identified. The detected actual deadlock state may be indicated by generating a signal. The method may comprise initiating recovery from detected deadlock conditions by generating at least one signal that indicates when data is accepted in response to the indication of the actual deadlock state.

Figure 1:
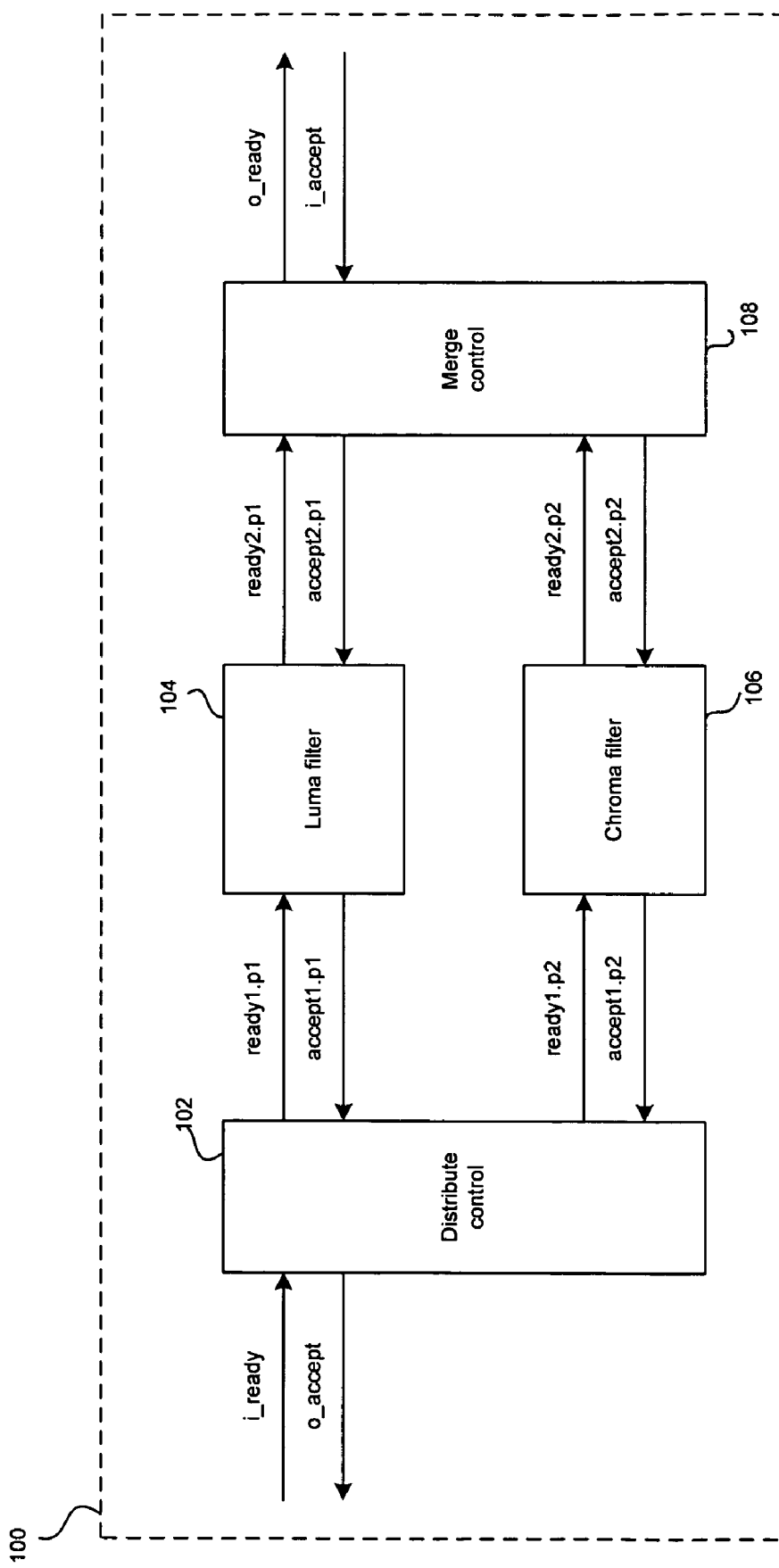
FIG. 1 is a block diagram of a conventional system that utilizes a distribute and merge data processing system.
Figure 2:
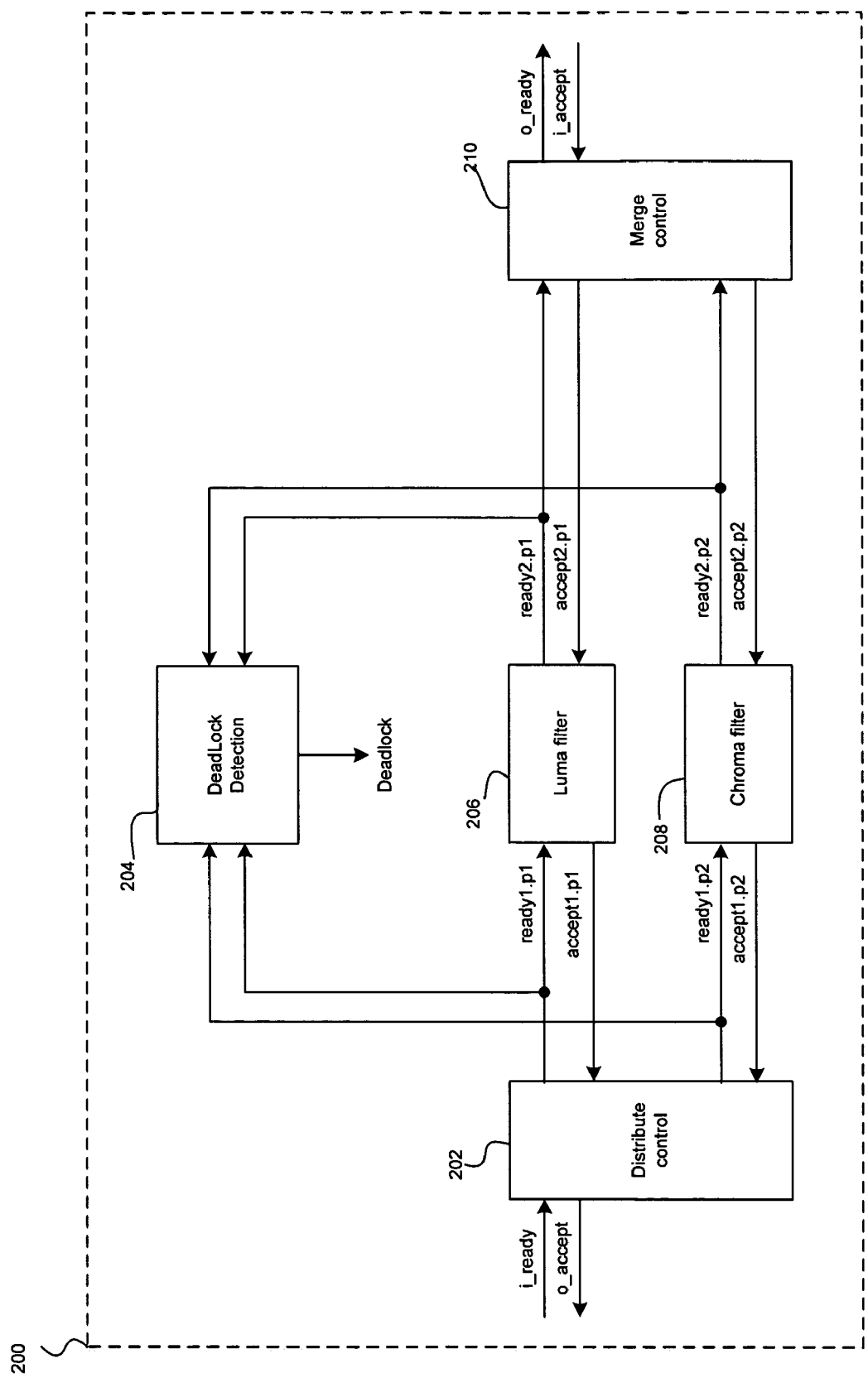
FIG. 2 is a block diagram illustrating deadlock detection in a distribute and merge data processing system in accordance with an embodiment of the invention.

FIG. 2 is a block diagram illustrating deadlock detection in a distribute and merge data processing system in accordance with an embodiment of the invention. Referring to FIG. 2, there is shown a system 200 that comprises distribute control block 202, deadlock detection block 204, luma filter 206, chroma filter 208 and merge control block 210.

The distribute control block 202 may comprise suitable logic, circuitry and/or code that may be adapted to receive data from one or more similar distribute and merge data processing systems, and may distribute data between two or more data paths. One data path (path 1) may be associated with the luma filter 206, while the other data path (path 2) may be associated with the chroma filter 208. The deadlock detection block 204 may comprise suitable logic, circuitry and/or code that may be adapted to receive and process a plurality of signals from the two data paths, path 1 and path 2, to detect a potential deadlock situation by monitoring an input and an output status of various data paths and may be configured to set a flag when it detects a potential deadlock situation. The ready1.p1 and ready1.p2 signals may be generated by the distribute control block 202, while the ready2.p1 and ready2.p2 signals may be generated by the luma filter 206 and the chroma filter 208 respectively. The deadlock detection block 204 may receive input signals ready1.p1 and ready1.p2 from distribute control block 202 and may receive output signals ready2.p1 and ready2.p2 from luma filter 206 and chroma filter 208 respectively. The deadlock detection block 204 may be coupled to the distribute control block 202 by the input signals ready1.p1 and ready1.p2 and may be coupled to the merge control block 210 with the output signals ready2.p1 and ready2.p2. The luma filter 206 may be a notch and bandpass filter, for example, and may be adapted to allow luma data through and block chroma data. The chroma filter 208 may be a comb filter, for example, and may be adapted to separate chroma data from luma data in the frequency domain. The merge control block 210 may be adapted to receive data from path 1 and path 2 and merge the data from two or more data paths. An exemplary embodiment of the invention may comprise a video system. In this regard, exemplary path 1 and path 2 may comprise a chroma path and a luma path respectively.

In operation, the deadlock detection block 204 may be adapted to constantly monitor an input status and an output status of path 1 and path 2. In instances, when input status and output status may indicate a potential deadlock situation, a deadlock voting counter may be triggered to start counting. The deadlock voting counter may be reset to zero if the potential deadlock situation is a false alarm. If the deadlock voting counter reaches a particular value such as a predefined threshold value, a deadlock flag may be set and the system may be declared to have reached a deadlock state.

Figure 3:
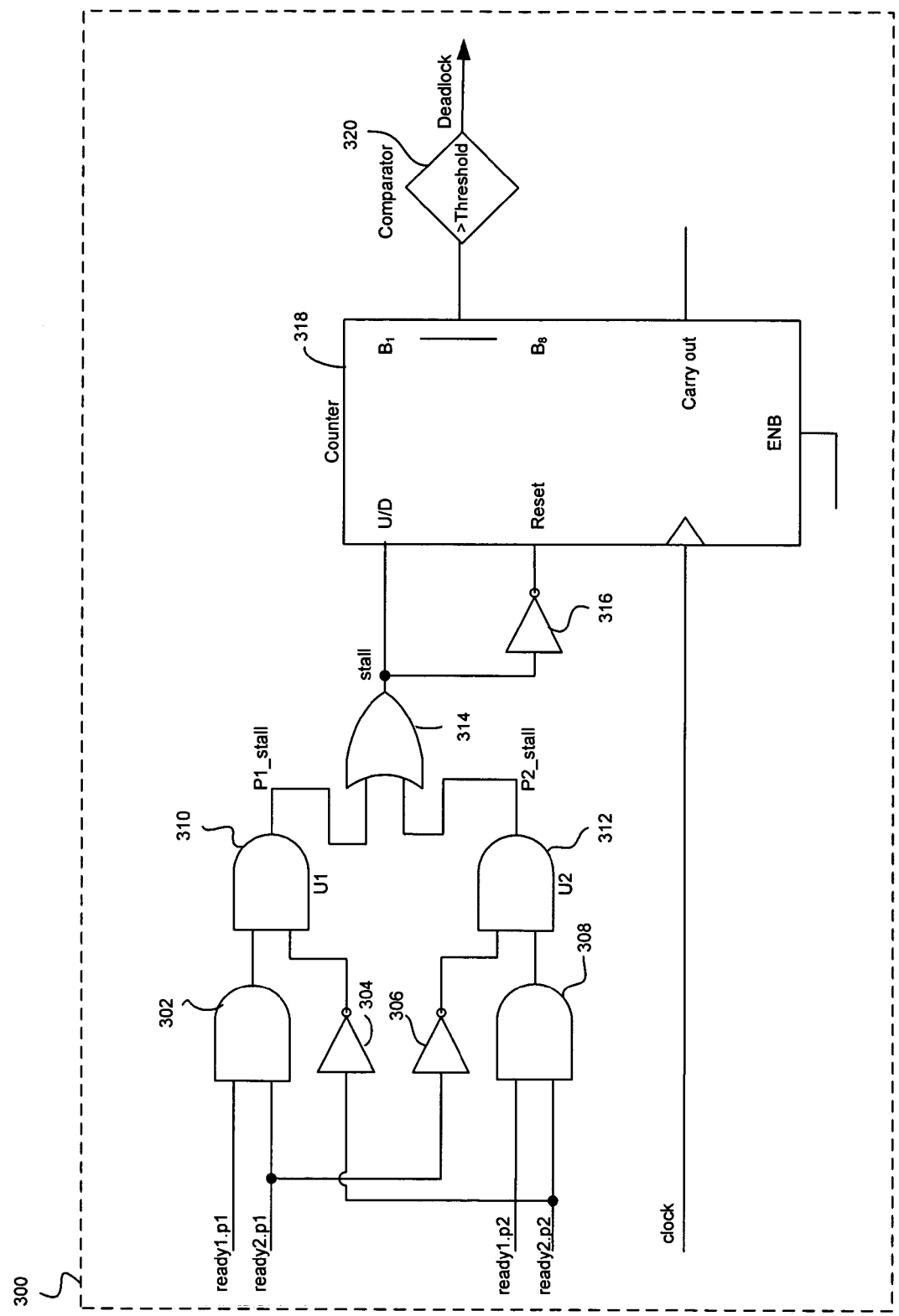
FIG. 3 is a block diagram illustrating an embodiment of the deadlock detection block in FIG. 2, for example, in a distribute and merge data processing system in accordance with an embodiment of the invention.

FIG. 3 is a block diagram illustrating an embodiment of the deadlock detection block in FIG. 2, for example, in a distribute and merge data processing system in accordance with an embodiment of the invention. Referring to FIG. 2 and FIG. 3, there is shown a system 300 that comprises four AND gates 302, 308, 310 and 312, three inverters 304, 306 and 316, an OR gate 314, a counter 318 and a comparator 320. FIG. 2 also comprises a plurality of signals, including ready1.p1, ready2.p1, ready1.p2, ready2.p2, P1_stall, P2_stall, stall and deadlock. The ready1.p1 and ready2.p1 signals are input signals to the AND gate 302. The ready2.p1 and ready2.p2 signals are input signals to AND gate 308. The P1_stall signal is the output signal from AND gate 310 and the P2_stall signal is the output signal from AND gate 312. The stall signal is the output signal from OR gate 314 and is the input signal to the counter 318. The deadlock signal is the output signal from the comparator 320 and is the input signal to the deadlock recovery block 406 (FIG. 4).

The AND gate 302 may be adapted to receive ready1.p1 signal from distribute control block 202 and ready2.p1 signal from luma filter 206 and output a signal to AND gate U1 310. The AND gate 308 may be adapted to receive ready1.p2 signal from the distribute control block 202 and ready2.p2 signal from chroma filter 208 and output a signal to the AND gate U2 312. The inverter 304 may receive the ready2.p2 signal and generate an output signal to the AND gate U1 310. The inverter 306 may receive the ready2.p1 signal and generate an output signal to the AND gate U2 312. The AND gate U1 310 may be adapted to receive the output of the AND gate 302 and the output of the inverter 304 and may output a signal, for example, a P1_stall signal which is an input to an OR gate 314. The AND gate U2 312 may be adapted to receive the output of the AND gate 308 and the output of the inverter 306 and may output a signal, for example, a P2_stall signal which is an input to an OR gate 314. The OR gate 314 may be adapted to receive inputs from the AND gate U1 310 and the AND gate U2 312 and output a stall signal to the counter 318. The inverter 316 may be adapted to receive a signal, for example, a stall signal from the OR gate 314 and generate an output signal, which may be used to reset the counter 318. The counter 318 may be an 8-bit up counter, for example, and may be adapted to receive an input from the OR gate 314 to start counting and an input from the inverter 316 to reset it. The counter 318 may be driven by a clock and may be adapted to output a signal to the comparator 320. The comparator 320 may be adapted to receive an input from the counter 320, compare it with a particular value such as a preset threshold value and may generate an output which may be an input signal to a deadlock recovery block.

In operation, when a data path with the luma filter 206 is full and the data path with the chroma filter 208 is empty, P1_stall signal may be asserted when both inputs to AND gate U1 310 are asserted. The output of the AND gate 302 may be asserted when both ready1.p1 and ready2.p1 signals are asserted and the output of the inverter 304 may be asserted when the ready2.p2 signal is deasserted, thereby detecting a potential stall condition. Similarly, when a data path with the chroma filter 208 is full and the data path with the luma filter 206 is empty, P2_stall signal may be asserted when both inputs to the AND gate U2 312 are asserted. The output of the AND gate 308 may be asserted when both ready1.p2 and ready2.p2 signals are asserted and the output of the inverter 306 may be asserted when ready2.p1 signal is deasserted, thereby detecting a potential stall condition. The stall signal may be asserted so as to detect a potential stall condition if either the output of the AND gate 310 is asserted or the output of the AND gate 312 is asserted. When the stall signal is asserted, the counter 318 may start counting up. The output value of the counter 318 is compared to a particular value such as a preset threshold value in the comparator 320 and when the output value of the counter 318 is greater than the preset threshold value in the comparator 320, a flag, for example, a deadlock flag may be set high in order to indicate a deadlock situation. To prevent the counter 318 from accumulating values due to a falsely detected potential stall condition, the counter 318 may be reset when the output of the OR gate 314 is deasserted.

Figure 4:
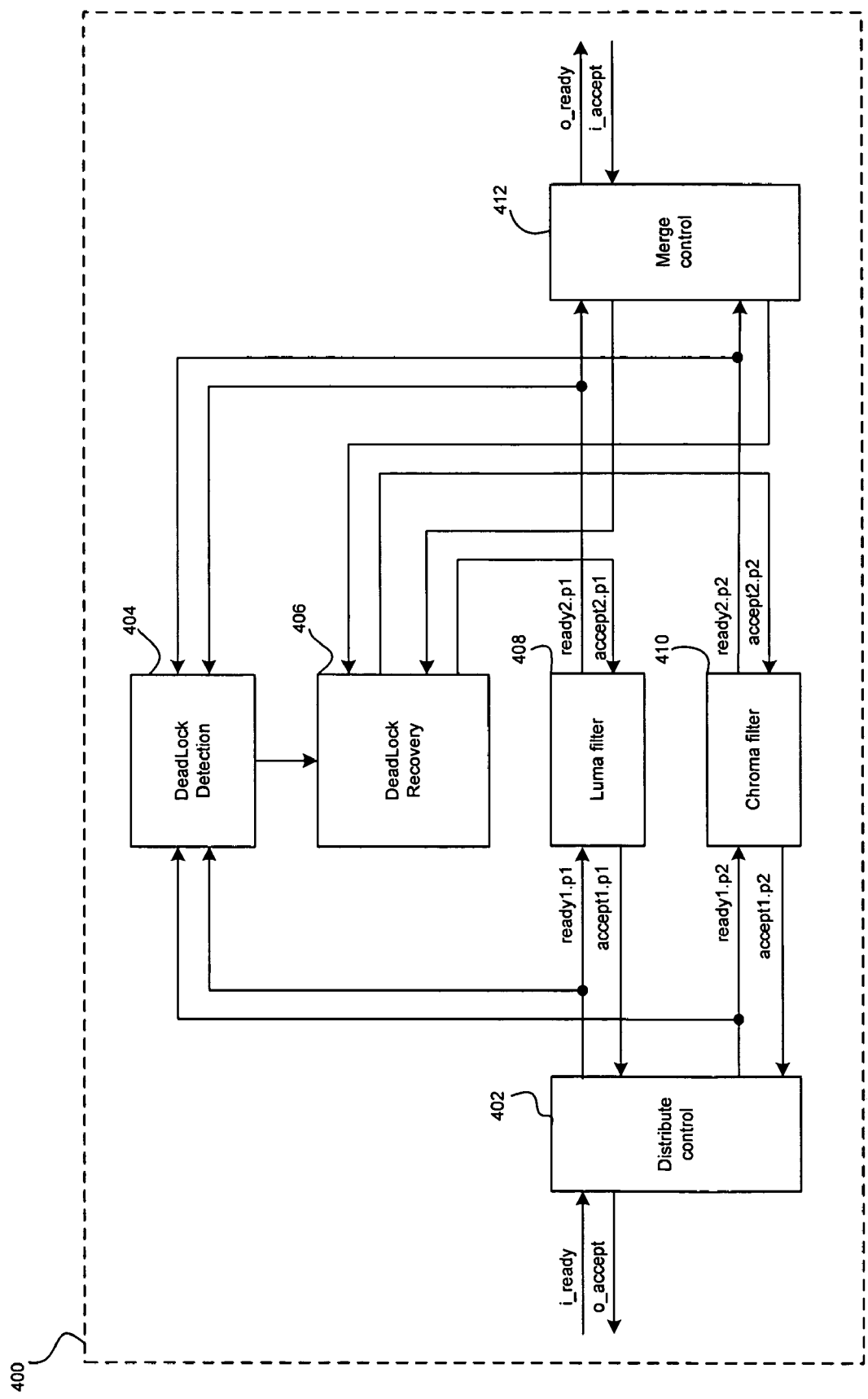
FIG. 4 is a block diagram illustrating deadlock detection and deadlock recovery in a distribute and merge data processing system in accordance with an embodiment of the invention.

FIG. 4 is a block diagram illustrating deadlock detection and deadlock recovery in a distribute and merge data processing system in accordance with an embodiment of the invention. Referring to FIG. 4, there is shown a system 400 that comprises distribute control block 402, deadlock detection block 404, deadlock recovery block 406, luma filter 408, chroma filter 410 and merge control block 412. The deadlock recovery block 406 may comprise suitable logic, circuitry and/or code that may be adapted to receive and process a plurality of signals from path 1 and path 2 to recover from a deadlock situation. The accept2.p1 and accept2.p2 signals may be generated by the merge control block 412. The deadlock recovery block 406 may receive input signals accept2.p1 and accept2.p2 from the merge control block 412 and a deadlock signal from the deadlock detection block 404. The deadlock recovery block 406 may be coupled to the merge control block 412 by the input signals accept2.p1 and accept2.p2 and may be coupled to the deadlock detection block 404 with the deadlock signal.

The distribute control block 402 may receive data from similar distribute and merge data processing system and may distribute data between path 1 and path 2. The deadlock detection block 404 may be adapted to detect a deadlock situation and set a flag. The deadlock detection block 404 may receive input signals ready1.p1 and ready1.p2 from distribute control block 402 and may receive output signals ready2.p1 and ready2.p2 from luma filter 408 and chroma filter 410 respectively. The deadlock recovery block 406 may comprise suitable logic and/or circuitry to detect a deadlock flag that has been set and perform suitable steps to recover from the deadlock situation. The luma filter 408 may be a notch and bandpass filter, for example, and may be adapted to allow luma data through and block chroma data. The chroma filter 410 may be a comb filter, for example, and may be adapted to separate chroma data from luma data in the frequency domain. The merge control block 412 may be adapted to receive data from path 1 and path 2 and merge the data from two or more data paths.

In operation, when there is no deadlock situation, the accept2.p1 signal from the merge control block 412 may be routed directly to the luma filter 408 via the deadlock recovery block 406. In a deadlock situation, when the luma filter 408 is full of data and the chroma filter 410 is empty, the merge control block 412 may not send back an accept2.p1 signal to the luma filter 408. Accordingly, the luma filter 408 may not be able to send out data downstream. During a deadlock situation, although the merge control block 412 may not generate an accept2.p1 signal to the luma filter 408, the deadlock recovery block 406 may generate an accept2.p1 signal to the luma filter 408 and the luma filter 408 may continue to transmit data to the merge control block 412. The luma filter 408 may slowly drain data and the distribute control block 402 may be able to distribute data to path 1 and path 2. The chroma filter 410 may receive data from distribute control block 402 and the system may recover from a deadlock situation.

Similarly, in a deadlock situation, when the chroma filter 410 is full of data and luma filter 408 is empty, the merge control block 412 may not send back an accept2.p2 signal to the chroma filter 410 and hence the chroma filter 410 may not be able to send out data downstream. During a deadlock situation, although the merge control block 412 may not generate an accept2.p2 signal to chroma filter 410, the deadlock recovery block 406 may generate an accept2.p2 signal to chroma filter 410 and the chroma filter 410 may continue to transmit data to merge control block 412. The chroma filter 410 may slowly drain data and the distribute control block 402 may be able to distribute data to path 1 and path 2. The luma filter 408 may be adapted to receive data from the distribute control block 402 and the system may recover from a deadlock situation.

Figure 5:
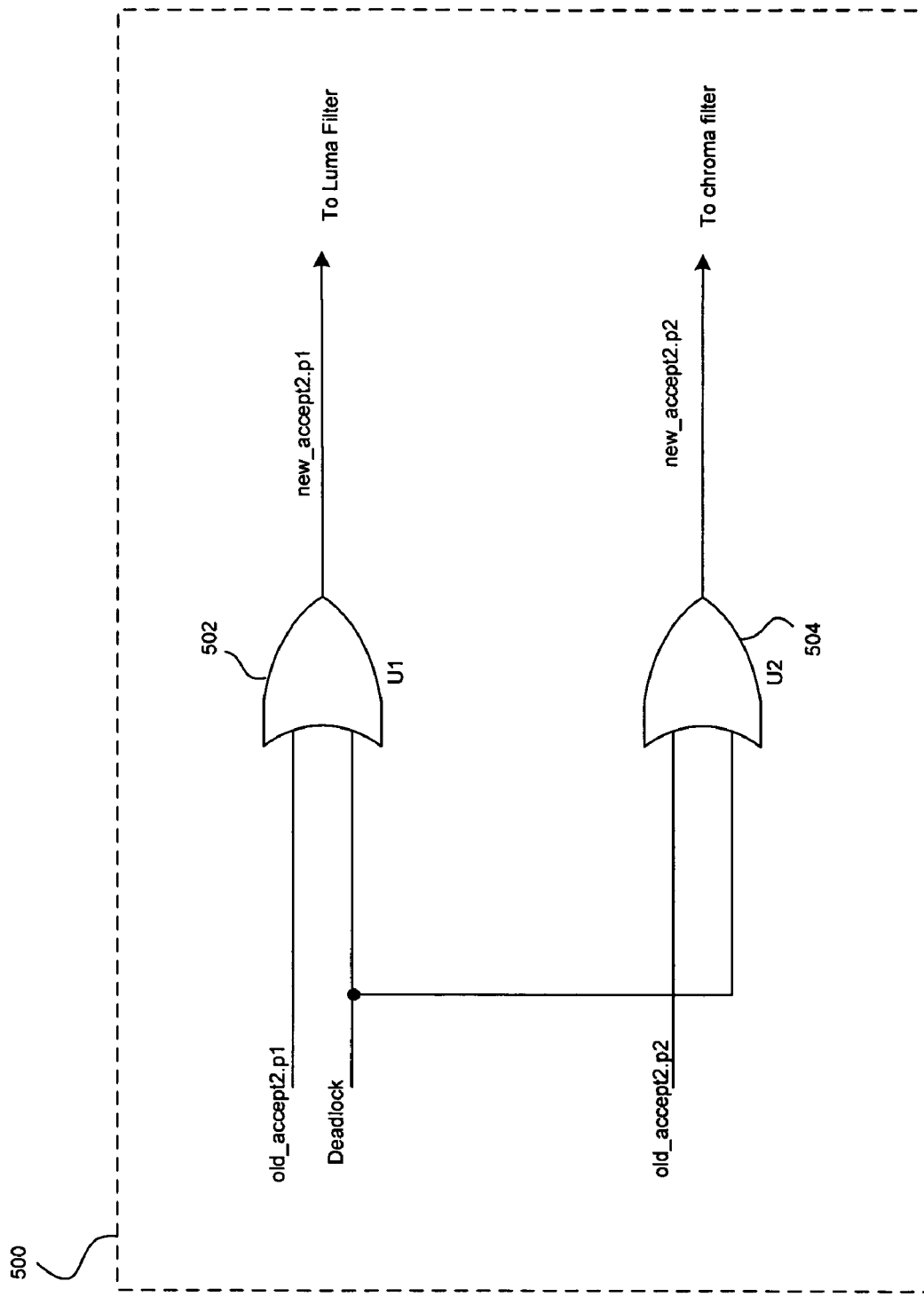
FIG. 5 is a block diagram illustrating an embodiment of the deadlock recovery block in FIG. 4, for example, in a distribute and merge data processing system in accordance with an embodiment of the invention.

FIG. 5 is a block diagram illustrating an embodiment of the deadlock recovery block in FIG. 4, for example, in a distribute and merge data processing system in accordance with an embodiment of the invention. Referring to FIG. 4 and FIG. 5, there is shown a system 500 that comprises two OR gates U1 502 and U2 504. The OR gate U1 502 may be adapted to receive at least two inputs, one from the merge control block 412, for example, an old_accept2.p1 signal and a deadlock signal from the deadlock detection block 404 indicating a deadlock situation. The OR gate U2 504 may be adapted to receive at least two inputs, one from the merge control block 412, for example, an old_accept2.p2 signal and a deadlock signal from the deadlock detection block 404 indicating a deadlock situation.

In operation, the OR gate U1 502 may output a high signal new_accept2.p1 to the luma filter 408, if either old_accept2.p1 signal is asserted indicating a normal situation or if the deadlock signal is asserted indicating a deadlock situation. Similarly, the OR gate U2 504 may assert the new_accept2.p2 signal to the chroma filter 410, if either old_accept2.p2 signal is asserted indicating a normal situation or if the deadlock signal is asserted indicating a deadlock situation. During normal operation, when the deadlock signal is deasserted, the old accept signals (old_accept2.p1 and old_accept2.p2) are communicated to the luma filter 408 and chroma filter 410 respectively. During a deadlock situation, when path 1 is full, the new_accept2.p1 signal may be asserted and may begin draining out data from path 1.

When path 1 is less than its full capacity, the distribute control block 402 may resume to transmit data into both data paths (path 1 and path 2) and the system may recover from a deadlock situation. Similarly, during a deadlock situation, when path 2 is full, the new_accept2.p2 signal may be asserted and may begin draining out data from path 2. When path 2 is less than its full capacity, the distribute control block 402 may resume transmission of data into both data paths (path 1 and path 2) to the merge control block 412 and the system may recover from a deadlock situation.

Figure 6:
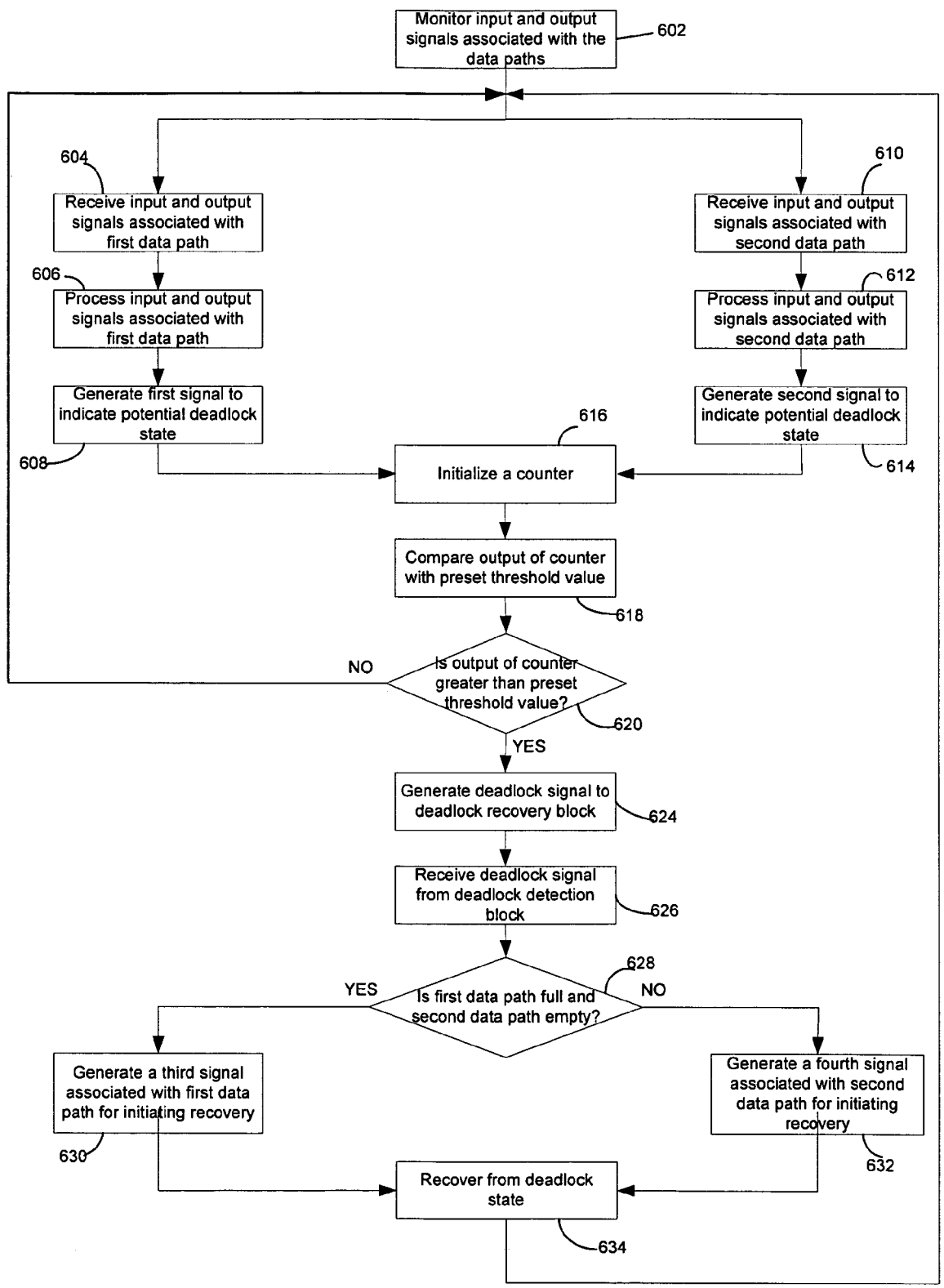
FIG. 6 is a flowchart illustrating a method for handling deadlock conditions in a distribute and merge data processing system in accordance with an embodiment of the invention.

FIG. 6 is a flowchart illustrating exemplary steps for a method for handling deadlock conditions in a distribute and merge data processing system in accordance with an embodiment of the invention. Referring to FIG. 6, in step 602, input and output signals from different data paths are monitored. In step 604, a first input signal and a first output signal may be received which are associated with a first data path, and which may be utilized to detect a potential deadlock state. In step 606, the received first input signal and the first output signal associated with the first data path may be processed to detect the potential deadlock state. In step 608, when the potential deadlock state is detected, a first signal may be generated to indicate the potential deadlock state. Similarly, in step 610, a second input signal and a second output signal may be received, which may be associated with a second data path to detect the potential deadlock state.

In step 612, the received second input signal and the second output signal associated with the second data path may be processed to detect the potential deadlock state. In step 614, when the potential deadlock state is detected, a second signal may be generated. In step 616, a counter may be initialized to count up in response to receiving the first signal and the second signal when the potential deadlock state is detected. The counter may be reset to zero if no potential deadlock state is detected. In step 618, the output of the counter may be compared with a preset threshold value to detect the actual deadlock state. In step 620, if the output of the counter is less than the preset threshold value, control passes back to step 602.

On the other hand in step 620, if the output of the counter is greater than the preset threshold value, then control passes to step 624, where a deadlock signal may be generated to the deadlock recovery block. In step 626, the deadlock signal may be received from the deadlock detection block. In step 628, if the first data path is full and the second data path is empty, then control passes to step 630, where a third signal may be generated, which is associated with the first data path, and which may be utilized for initiating recovery in response to receiving the generated deadlock signal. In step 628, if the first data path is empty and the second data path is full, then control passes to step 632, where a fourth signal may be generated, which is associated with the second data path, and which may be utilized for initiating recovery in response to receiving the generated deadlock signal. The control then passes to step 634, where the system recovers from a deadlock state and passes the control back to step 602.

Figure 7:
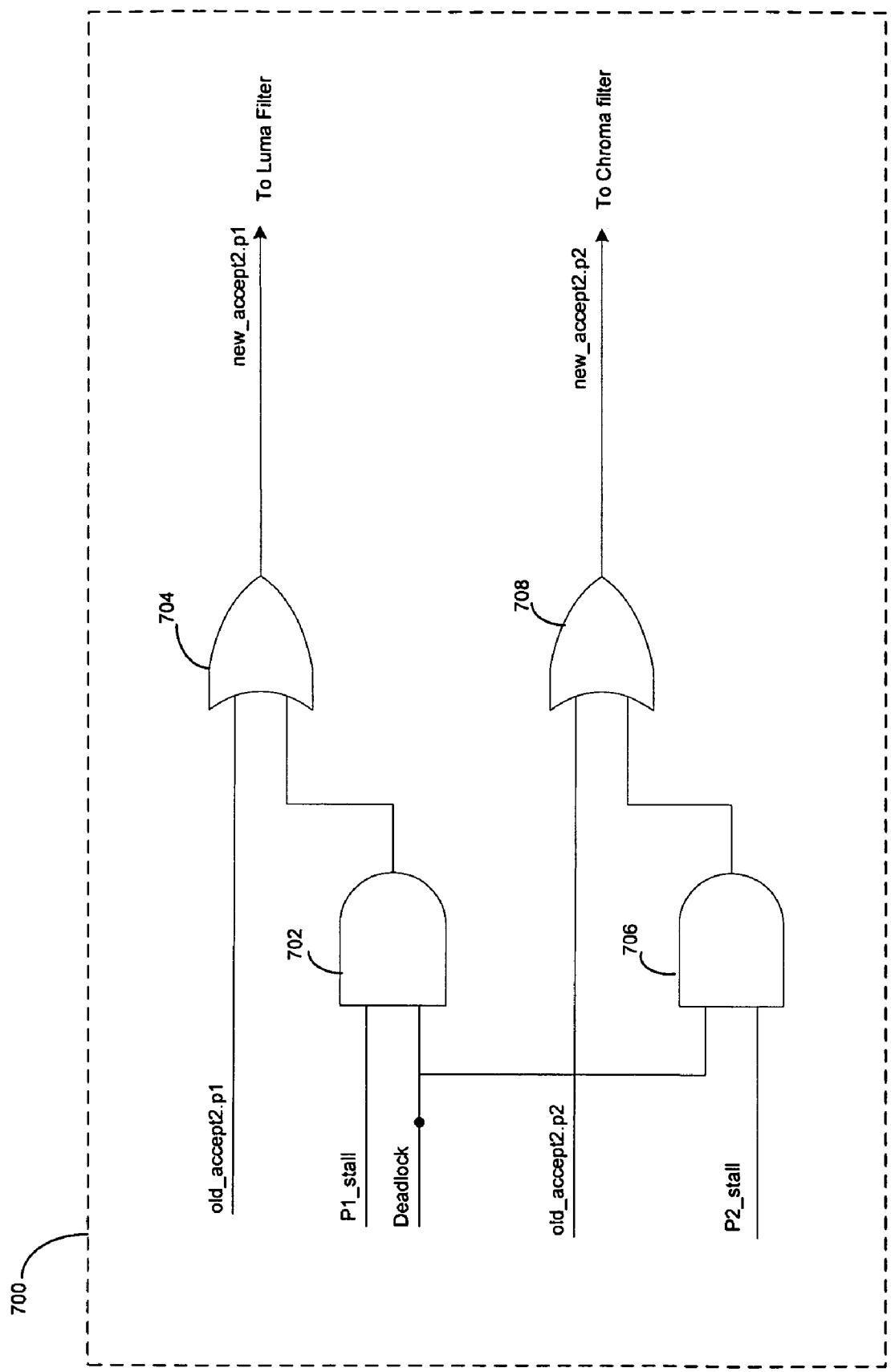
FIG. 7 is a block diagram illustrating another embodiment of the deadlock recovery block in FIG. 5, for example, in a distribute and merge data processing system in accordance with an embodiment of the invention.

FIG. 7 is a block diagram illustrating another embodiment of the deadlock recovery block in FIG. 5, for example, in a distribute and merge data processing system in accordance with an embodiment of the invention. Referring to FIG. 7, there is shown a system 700 that comprises two AND gates 702 and 706 and two OR gates 704 and 708. The AND gate 702 may be adapted to receive at least two inputs, one from the AND gate U1 310 (FIG. 3), for example, a potential deadlock signal P1_stall and a deadlock signal from the deadlock detection block 404 (FIG. 4) indicating a deadlock situation. The AND gate 706 may be adapted to receive at least two inputs, one from the AND gate U2 312 (FIG. 3), for example, a potential deadlock signal P2_stall and a deadlock signal from the deadlock detection block 404 indicating a deadlock situation. The OR gate 704 may be adapted to receive at least two inputs, one from the merge control block 412 (FIG. 4), for example, an old accept signal old_accept2.p1 and one from the output of AND gate 702. The OR gate 708 may be adapted to receive at least two inputs, one from the merge control block 412, for example, an old accept signal old_accept2.p2 signal and one from the output of AND gate 706.

In operation, during a deadlock situation, only the path that is full may be drained, while the path that is empty may be unchanged. The AND gate 702 may output a high signal if both the potential deadlock signal P1_stall and the deadlock signal are asserted. The OR gate 704 may output a high new accept signal new_accept2.p1 to the luma filter 408 (FIG. 4), if either the old accept signal old_accept2.p1 is asserted indicating a normal situation or if the output of the AND gate 702 outputs a high signal. Similarly, the AND gate 706 may output a high signal if both the potential deadlock signal P2_stall and the deadlock signal are asserted. The OR gate 708 may output a high new accept signal new_accept2.p2 to the chroma filter 410 (FIG. 4), if either an old accept signal old_accept2.p2 is asserted indicating a normal situation or if the output of the AND gate 706 outputs a high signal. During normal operation, when the deadlock signal is deasserted, the old accept signals (old_accept2.p1 and old_accept2.p2) are communicated to the luma filter 408 and chroma filter 410 respectively.

During a deadlock situation, when path 1 is full, the potential stall signal P1_stall is asserted and the AND gate 702 may output a high signal. The OR gate 704 may then output a new accept signal new_accept2.p1 that may be asserted and may begin draining out data from path 1. The potential stall signal P2_stall is deasserted, as path 2 is empty and the output of AND gate 706 may be deasserted. The OR gate 708 may output a new accept signal new_accept2.p2 similar to the old accept signal old_accept2.p2 to the chroma filter 410.

Similarly, when path 2 is full, the potential stall signal P2_stall is asserted and the AND gate 706 may output a high signal. The OR gate 708 may then output a new accept signal new_accept2.p2 that may be asserted and may begin draining out data from path 2. The potential stall signal P1_stall is deasserted, as path 1 is empty and the output of AND gate 702 may be deasserted. The OR gate 704 may output a new accept signal new_accept2.p1 similar to the old accept signal old_accept2.p1 to the luma filter 408. During a deadlock situation, the path that is full may be drained, while the path that is empty may remain unchanged to ensure that no data is drained from the path that is empty.

In accordance with an embodiment of the invention, a system for handling deadlock conditions in a data processing system may be provided. Referring to FIG. 2, FIG. 3, FIG. 4 and FIG. 5, the system may comprise circuitry that may identify a potential deadlock state in a distribute and merge data processing system. The deadlock detection block 204 may be adapted to detect an actual deadlock state once the potential deadlock state is identified. The deadlock detection block 204 (FIG. 2) may be adapted to indicate the detected actual deadlock state by generating a deadlock signal. The deadlock recovery block 406 (FIG. 4) may comprise circuitry for initiating recovery from deadlock conditions by generating new_accept2.p1 and new_accept2.p2 signals that indicate when data is accepted in response to the deadlock signal that indicates the actual deadlock state. The AND gate 302 (FIG. 3) in the deadlock detection block 204 may be adapted to receive and process ready1.p1 and ready2.p1 signals associated with at least a first data path to detect the potential deadlock state. The AND gate 310 may be adapted to generate a P1_stall signal when the potential deadlock state is detected. The AND gate 308 in the deadlock detection block 204 may be adapted to receive and process ready1.p2 and ready2.p2 signals associated with at least a second data path to detect the potential deadlock state. The AND gate 312 may be adapted to generate a P2_stall signal when the potential deadlock state is detected. The OR gate 314 may be adapted to generate a stall signal that initializes a counter 318 in response to receiving the P1_stall and P2_stall signals detecting the potential deadlock state. A comparator 320 may be adapted to compare the output of the counter with a particular value to detect the actual deadlock state. The comparator 320 may be further adapted to generate a deadlock signal if the output of the counter 318 is greater than the particular value. The OR gate 502 (FIG. 5) may be adapted to generate a new_accept2.p1 signal associated with at least the first data path for initiating recovery in response to receiving the generated deadlock signal. The OR gate 504 may be adapted to generate a new_accept2.p2 signal associated with at least the second data path for initiating recovery in response to receiving the generated deadlock signal.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling deadlock conditions in a data processing system, the method comprising:
    identifying a potential deadlock state when at least one data path is full and at least one other data path is empty;
    detecting an actual deadlock state based on said identified potential deadlock state;
    generating at least a first signal to indicate said detected actual deadlock state; and
    initiating recovery from said detected actual deadlock state by generating at least one signal that enables distribution of data between said at least one data path and said at least one other data path.

2. The method according to claim 1, comprising receiving at least a first input signal and a first output signal associated with at least a first data path and a second output signal associated with at least a second data path to identify said potential deadlock state.

3. The method according to claim 2, comprising processing said first input signal and said first output signal associated with said first data path and said second output signal associated with said second data path to identify said potential deadlock state.

4. The method according to claim 3, comprising generating at least a second signal indicating said identified potential deadlock state.

5. The method according to claim 4, comprising receiving at least a second input signal and said second output signal associated with said second data path and said first output signal associated with said first data path to identify said potential deadlock state.

6. The method according to claim 5, comprising processing said second input signal and said second output signal associated with said second data path and said first output signal associated with said first data path to identify said potential deadlock state.

7. The method according to claim 6, comprising generating at least a third signal indicating said identified potential deadlock state.

8. The method according to claim 7, comprising generating at least a fourth signal that initializes a counter in response to receiving said generated second signal and said generated third signal detecting said potential deadlock state.

9. The method according to claim 8, comprising comparing an output of said counter with a particular value to detect said actual deadlock state.

10. The method according to claim 9, comprising generating said first signal when said output of said counter is greater than said particular value.

11. The method according to claim 10, comprising receiving said generated first signal detecting said actual deadlock state for said initiating of said recovery.

12. The method according to claim 10, comprising generating at least a fifth signal associated with said first data path that enables distribution of said data between said first data path and said second data path in response to receiving said generated first signal.

13. The method according to claim 12, comprising generating at least a sixth signal associated with said second data path that enables distribution of said data between said first data path and said second data path in response to receiving said generated first signal.

14. The method according to claim 1, comprising identifying said potential deadlock state when at least a first data path is full and at least a second data path is empty.

15. The method according to claim 1, comprising identifying said potential deadlock state when at least a first data path is empty and at least a second data path is full.

16. A machine-readable storage having stored thereon, a computer program having at least one code section for handling deadlock conditions in a data processing system, the at least one code section being executable by a machine for causing the machine to perform steps comprising:
    identifying a potential deadlock state when at least one data path is full and at least one other data path is empty;
    detecting an actual deadlock state based on said identified potential deadlock state;
    generating at least a first signal to indicate said detected actual deadlock state; and
    initiating recovery from said detected actual deadlock state by generating at least one signal that enables distribution of data between said at least one data path and said at least one other data path.

17. The machine-readable storage according to claim 16, comprising code for receiving at least a first input signal and a first output signal associated with at least a first data path and a second output signal associated with at least a second data path to identify said potential deadlock state.

18. The machine-readable storage according to claim 17, comprising code for processing said first input signal and said first output signal associated with said first data path and said second output signal associated with said second data path to identify said potential deadlock state.

19. The machine-readable storage according to claim 18, comprising code for processing said first input signal and said first output signal associated with said first data path and said second output signal associated with said second data path to identify said potential deadlock state.

20. The machine-readable storage according to claim 19, comprising code for receiving at least a second input signal and said second output signal associated with said second data path and said first output signal associated with said first data path to identify said potential deadlock state.

21. The machine-readable storage according to claim 20, comprising code for processing said second input signal and said second output signal associated with said second data path and said first output signal associated with said first data path to identify said potential deadlock state.

22. The machine-readable storage according to claim 21, comprising code for generating at least a third signal indicating said identified potential deadlock state.

23. The machine-readable storage according to claim 22, comprising code for generating at least a fourth signal that initializes a counter in response to receiving said generated second signal and said generated third signal identifying said potential deadlock state.

24. The machine-readable storage according to claim 23, comprising code for comparing an output of said counter with a particular value to detect said actual deadlock state.

25. The machine-readable storage according to claim 24, comprising code for generating said first signal when said output of said counter is greater than said particular value.

26. The machine-readable storage according to claim 25, comprising code for receiving said generated first signal detecting said actual deadlock state for said initiating of said recovery.

27. The machine-readable storage according to claim 25, comprising code for generating at least a fifth signal associated with said first data path that enables distribution of said data between said first data path and said second data path in response to receiving said generated first signal.

28. The machine-readable storage according to claim 27, comprising code for generating at least a sixth signal associated with said second data path that enables distribution of said data between said first data path and said second data path in response to receiving said generated first signal.

29. A system for handling deadlock conditions in a data processing system, the system comprising:
    circuitry that enables identification of a potential deadlock state when at least one data path is full and at least one other data path is empty;
    circuitry that enables detection of an actual deadlock state based on said identified potential deadlock state;
    circuitry that enables generation of at least a first signal that indicates said detected actual deadlock state; and
    circuitry that enables initiation of recovery from said detected actual deadlock state by generating at least one signal that enables distribution of data between said at least one data path and said at least one other data path.

30. The system according to claim 29, comprising circuitry that enables receipt of at least a first input signal and a first output signal associated with at least a first data path and a second output signal associated with at least a second data path to identify said potential deadlock state.

31. A system for handling deadlock conditions in a data processing system, the system comprising:
    circuitry that enables identification of a potential deadlock state when at least one data path is full and at least one other data path is empty;
    circuitry that enables detection of an actual deadlock state based on said identified potential deadlock state;
    circuitry that enables generation of at least a first signal that indicates said detected actual deadlock state; and
    circuitry that enables initiation of recovery from said detected actual deadlock state by generating at least one signal that enables distribution of data between said at least one data path and said at least one other data path.

32. The system according to claim 31, comprising circuitry that enables receipt of at least a first input signal and a first output signal associated with at least a first data path and a second output signal associated with at least a second data path to identify said potential deadlock state.

33. The system according to claim 32, comprising circuitry that enables processing of said first input signal and said first output signal associated with said first data path and said second output signal associated with said second data path to identify said potential deadlock state.

34. The system according to claim 33, comprising circuitry that enables generation of at least a second signal indicating said identified potential deadlock state.

35. The system according to claim 34, comprising circuitry that enables receipt of at least a second input signal and said second output signal associated with said second data path and said first output signal associated with said first data path to identify said potential deadlock state.

36. The system according to claim 35, comprising circuitry that enables processing of said second input signal and said second output signal associated with said second data path and said first output signal associated with said first data path to identify said potential deadlock state.

37. The system according to claim 36, comprising circuitry that enables generation of at least a third signal indicating said identified potential deadlock state.

38. The system according to claim 37, comprising circuitry that enables generation of at least a fourth signal that initializes a counter in response to receiving said generated second signal and said generated third signal identifying said potential deadlock state.

39. The system according to claim 38, comprising a comparator that compares an output of said counter with a particular value to detect said actual deadlock state.

40. The system according to claim 39, comprising said comparator that generates said first signal when said output of said counter is greater than said particular value.

41. The system according to claim 40, comprising circuitry that enables receipt of said generated first signal detecting said actual deadlock state for said initiating of said recovery.

42. The system according to claim 40, comprising circuitry that enables generation of at least a fifth signal associated with said first data path that enables distribution of said data between said first data path and said second data path in response to receiving said generated first signal.

43. The system according to claim 42, comprising circuitry that enables generation of at least a sixth signal associated with said second data path that enables distribution of said data between said first data path and said second data path in response to receiving said generated first signal.

44. The system according to claim 31, comprising circuitry that enables identification of said potential deadlock state when at least a first data path is full and at least a second data path is empty.

45. The system according to claim 31, comprising circuitry that enables identification of said potential deadlock state when at least a first data path is empty and at least a second data path is full.

* * * * *